US011738750B2

(12) United States Patent
Wessel et al.

(10) Patent No.: US 11,738,750 B2
(45) Date of Patent: Aug. 29, 2023

(54) METHOD FOR CONTROLLING A MOTOR VEHICLE (71) Applicant: Scania CV AB, Södertälje (SE)

(72) Inventors: Christian Wessel, Södertälje (SE); Andreas Szilassy, Hägersten (SE); Oscar Flärdh, Älvsjö (SE); Mikael Ögren, Rönninge (SE); Richard Boström, Nykvarn (SE)

(73) Assignee: Scania CV AB, Södertälje (SE)

( * ) Notice: Subject to any disclaimer, the term of this patent is extended or adjusted under 35 U.S.C. 154(b) by 361 days.

(21) Appl. No.: 17/048,646

(22) PCT Filed: Apr. 17, 2019

(86) PCT No.: PCT/SE2019/050352
§ 371 (c)(1),
(2) Date: Oct. 19, 2020

(87) PCT Pub. No.: WO2019/209158
PCT Pub. Date: Oct. 31, 2019

(65) Prior Publication Data
US 2021/0237728 A1 Aug. 5, 2021

(30) Foreign Application Priority Data
Apr. 26, 2018 (SE) .................... 1850500-8

(51) Int. Cl.
B60W 10/18 (2012.01)
B60W 30/14 (2006.01)
(Continued)

(52) U.S. Cl.
CPC .......... B60W 30/146 (2013.01); B60W 10/18 (2013.01); B60W 30/18109 (2013.01);
(Continued)

(58) Field of Classification Search
CPC ............... B60W 30/146; B60W 10/18; B60W 30/18109; B60W 40/076; B60W 40/105;
(Continued)

(56) References Cited

U.S. PATENT DOCUMENTS 6,015,194 A 1/2000 Decker
9,725,093 B2 8/2017 Chunodkar et al.
(Continued)

FOREIGN PATENT DOCUMENTS

CN 101883695 A 11/2010
CN 103661377 A 3/2014
(Continued)

OTHER PUBLICATIONS

Johnny et al., DE10357444 (A1), Bibliographic Dat, Assignee: Scania CV AB, Title: Motor vehicle automatic braking method, e.g. for preventing a vehicle exceeding a predefined speed, using auxiliary brake, e.g. an exhaust brake, with extra power if necessary by automatic changing to a lower gear. (Year: 2004).*
(Continued)

Primary Examiner — B M M Hannan
(74) Attorney, Agent, or Firm — Moore & Van Allen PLLC; W. Kevin Ransom (57) ABSTRACT A method for controlling a motor vehicle, comprising: retrieving road gradient data relating to an expected travelling route of the motor vehicle; based on at least the retrieved road gradient data and on a motor vehicle mass, simulating a required value of a braking power related variable, which required value is needed to prevent a vehicle speed from increasing above a preset desired vehicle speed in an upcoming downhill slope; determining an available value of the braking power related variable of at least one auxiliary brake of the motor vehicle; and based on the determined available value and the simulated required value
(Continued)

of the braking power related variable, controlling the vehicle speed and/or at least one brake actuator of the motor vehicle such that the vehicle speed does not increase above the preset desired vehicle speed in the upcoming downhill slope.

15 Claims, 3 Drawing Sheets

(51) Int. Cl.
  *B60W 30/18* (2012.01)
  *B60W 40/076* (2012.01)
  *B60W 40/105* (2012.01)
  *B60W 40/13* (2012.01)

(52) U.S. Cl.
  CPC ........ *B60W 40/076* (2013.01); *B60W 40/105* (2013.01); *B60W 40/13* (2013.01); *B60W 2510/0676* (2013.01); *B60W 2510/087* (2013.01); *B60W 2510/18* (2013.01); *B60W 2552/15* (2020.02); *B60W 2710/18* (2013.01)

(58) Field of Classification Search
  CPC ........ B60W 40/13; B60W 2510/0676; B60W 2510/087; B60W 2510/18; B60W 2552/15; B60W 2710/18; B60W 2030/18081; B60W 2556/50; B60W 10/02; B60W 30/18072; B60W 30/18136; B60W 50/0097; B60W 30/143; B60T 2210/20; B60T 2260/09; B60T 2270/60; B60T 1/10; B60T 1/087; B60T 7/18; B60T 7/22; B60T 10/02; F16D 57/04; F16D 61/00
  USPC .............................................. 701/93, 94, 110
  See application file for complete search history.

(56) References Cited

U.S. PATENT DOCUMENTS

| | | | |
|---|---|---|---|
| 9,849,884 B2 | 12/2017 | Kim | |
| 10,065,641 B2 | 9/2018 | Fraser et al. | |
| 10,668,923 B2 | 6/2020 | Breuer et al. | |
| 2002/0143457 A1* | 10/2002 | Hellmann | B60K 31/04 701/96 |
| 2005/0052075 A1 | 3/2005 | Sabelstrom et al. | |
| 2006/0064277 A1* | 3/2006 | Jung | A63B 24/0062 702/160 |
| 2006/0113833 A1 | 6/2006 | Lingman et al. | |
| 2006/0149450 A1* | 7/2006 | Taffin | F16H 61/0213 701/56 |
| 2010/0280729 A1* | 11/2010 | Samsioe | B60W 10/196 701/93 |
| 2010/0299049 A1* | 11/2010 | Kang | F02D 41/402 701/113 |
| 2012/0065852 A1* | 3/2012 | Eriksson | B60W 30/18072 701/55 |
| 2012/0089313 A1* | 4/2012 | Frashure | B60T 13/585 701/94 |
| 2012/0123658 A1* | 5/2012 | Kagawa | G08G 1/164 701/93 |
| 2012/0271499 A1 | 10/2012 | Inoue et al. | |
| 2014/0067211 A1 | 3/2014 | Kim | |
| 2014/0121889 A1* | 5/2014 | Sodergren | B60W 40/1005 703/2 |
| 2015/0210281 A1* | 7/2015 | Johansson | B60K 31/00 701/94 |
| 2016/0332632 A1* | 11/2016 | Roos | B60W 30/18136 |
| 2017/0061811 A1* | 3/2017 | Douglas | G09B 9/04 |
| 2017/0129467 A1 | 5/2017 | Karlsson et al. | |
| 2017/0129492 A1 | 5/2017 | Follen et al. | |
| 2017/0144663 A1 | 5/2017 | Karlsson et al. | |
| 2017/0297573 A1 | 10/2017 | Fraser et al. | |
| 2018/0244247 A1* | 8/2018 | Carlsson | B60W 30/143 |
| 2018/0244269 A1* | 8/2018 | Carlsson | B60W 30/1884 |

FOREIGN PATENT DOCUMENTS

| | | | | |
|---|---|---|---|---|
| CN | 105008187 A | * | 10/2015 | ............. B60T 1/087 |
| CN | 105599768 A | | 5/2016 | |
| CN | 106414203 A | | 2/2017 | |
| CN | 106853829 A | | 6/2017 | |
| CN | 107298101 A | | 10/2017 | |
| DE | 10357444 A1 | * | 6/2004 | ............. B60K 31/10 |
| DE | 102016012466 A1 | * | 5/2017 | ............. B60W 30/16 |
| DE | 102015015923 A1 | | 6/2017 | |
| EP | 0136690 A2 | | 4/1985 | |
| EP | 2918468 A2 | | 9/2015 | |
| EP | 3000675 A1 | | 3/2016 | |
| EP | 3018028 A2 | | 5/2016 | |
| JP | 2006082629 A | | 3/2006 | |
| SE | 1450705 A1 | | 5/2015 | |
| WO | 2009072965 A1 | | 6/2009 | |
| WO | WO-2012125107 A1 | * | 9/2012 | ............... B60K 6/12 |
| WO | 2012138262 A1 | | 10/2012 | |
| WO | WO-2013151489 A1 | * | 10/2013 | ............. B60K 31/00 |
| WO | 2013191614 A1 | | 12/2013 | |
| WO | 2014003637 A1 | | 1/2014 | |
| WO | 2014149043 A1 | | 9/2014 | |
| WO | 2015197092 A1 | | 12/2015 | |
| WO | 2016175787 A1 | | 11/2016 | |
| WO | WO-2019151918 A1 | * | 8/2019 | ............. B60W 30/16 |

OTHER PUBLICATIONS

Johnny et al., DE10357444 (A1), English Translate, Assignee: Scania CV AB, Title: Motor vehicle automatic braking method, e.g. for preventing a vehicle exceeding a predefined speed, using auxiliary brake, e.g. an exhaust brake, with extra power if necessary by automatic changing to a lower gear. (Year: 2004).*
Scania CV AB, International Application No. PCT/SE2019/050352, International Preliminary Report on Patentability, dated Oct. 27, 2020.
Scania CV AB, European Patent Application No. 19793060.5, Extended European Search Report, dated Dec. 9, 2021.
Scania CV AB, Chinese Patent Application No. 201980026692.8, First Office Action, dated Jan. 14, 2022.
Scania CV AB, International Application No. PCT/SE2019/050352, International Search Report, dated Jun. 27, 2019.
Scania CV AB, International Application No. PCT/SE2019/050352, Written Opinion, dated Jun. 27, 2019.
Scania CV AB, Swedish Application No. 1850500-8, Office Action, dated Oct. 23, 2018.

* cited by examiner

METHOD FOR CONTROLLING A MOTOR VEHICLE

CROSS-REFERENCE TO RELATED APPLICATIONS

This application is a National Stage Application (filed under 35 § U.S.C. 371) of PCT/SE2019/050352, filed Apr. 17, 2019 of the same title, which, in turn claims priority to Swedish Application No. 1850500-8 filed Apr. 26, 2018 of the same title; the contents of each of which are hereby incorporated by reference.

FIELD OF THE INVENTION

The present invention relates to a method and an apparatus for controlling a motor vehicle. The invention also relates to a computer program, a computer-readable medium and a motor vehicle.

BACKGROUND OF THE INVENTION

Modern motor vehicles are commonly provided with cruise controls for controlling vehicle speed. Usually, a driver of the vehicle selects a set speed, which is thereafter automatically maintained. Fuel-economizing cruise controls, aiming to reduce fuel consumption by adjusting the driving to the characteristics of the road ahead, are also becoming increasingly common. For example, by taking topographic information about the road section ahead of the vehicle into account, the vehicle speed may be temporarily increased before e.g. an uphill slope, so that downshifting to a lower transmission mode can be avoided or delayed. In this way, a total energy consumption can be reduced. Also information about road curvature and legal speed limits along the road section ahead of the vehicle can be taken into account.

Some motor vehicles are also equipped with a downhill speed control, i.e. a speed control configured to automatically engage an auxiliary brake and, if advantageous, initiate a shift to a lower gear when the vehicle speed exceeds a set braking speed in a downhill slope, wherein the set braking speed is to be understood as a defined threshold speed above which the motor vehicle is automatically braked when travelling downhill. Normally, the braking speed is set to a value slightly higher than the set speed of the cruise control regulating the vehicle speed. For example, if the set speed of the cruise control is 80 km/h, the braking speed may be set to 83 km/h. If the motor vehicle is travelling downhill and accelerates so that the braking speed is reached, one or more auxiliary brakes, such as a retarder or an engine brake in the form of a compression release brake or an exhaust brake, is/are engaged so that the vehicle speed is maintained at or below the braking speed. In this way, manual braking of the motor vehicle may be avoided in downhill slopes.

However, in certain downhill slopes, the braking power of the auxiliary brakes of the motor vehicle is insufficient to prevent the vehicle speed from increasing above the braking speed. Instead, the motor vehicle will accelerate and reach a vehicle speed which is too high. In such situations, the driver may be forced to manually brake the vehicle using a main brake of the vehicle, usually wheel brakes. The automatic speed control is thus interrupted, which may result in an increased energy consumption since the driver may brake the motor vehicle to a vehicle speed which is lower than necessary. Moreover, manual braking using the wheel brakes may in certain situations lead to an increased risk of overheating the wheel brakes, which is associated with safety risks. It may also lead to increased wear of the wheel brakes.

If the driver wants to reinitiate the automatic speed control in the downhill slope, a desired vehicle speed must first be reached. To avoid reoccurrence of the same situation, the driver also has to manually reduce the braking speed of the downhill speed control to a suitable value which is maintainable in the current downhill slope.

SUMMARY OF THE INVENTION

It would be desirable to achieve a method and an apparatus for controlling a motor vehicle, which method and apparatus overcome, or at least alleviate, the above mentioned problem. In particular, it would be advantageous to provide such a method and apparatus which may be used to control braking and/or vehicle speed of a motor vehicle such that the vehicle speed can be automatically maintained below a desired vehicle speed in downhill slopes, so that manual braking may be more easily avoided and so that driving comfort can thereby be improved.

To better address these concerns, a method and an apparatus as defined in the independent claims are provided.

According to one aspect, a method for controlling a motor vehicle is provided, the method comprising:

retrieving road gradient data relating to a road gradient along an expected travelling route of the motor vehicle, based on at least the retrieved road gradient data and on a mass of the motor vehicle, simulating a required value of a braking power related variable, which required value is needed to prevent a vehicle speed of the motor vehicle from increasing above a preset desired vehicle speed in an upcoming downhill slope, determining an available value of the braking power related variable of at least one auxiliary brake of the motor vehicle, based on the determined available value of the braking power related variable and the simulated required value of the braking power related variable, controlling the vehicle speed and/or at least one brake actuator of the motor vehicle before entering the downhill slope such that the vehicle speed does not increase above the preset desired vehicle speed in the upcoming downhill slope.

According to another aspect, an apparatus configured for controlling a motor vehicle is provided, the apparatus being configured to:

retrieve road gradient data relating to a road gradient along an expected travelling route of the motor vehicle, based on at least the retrieved road gradient data, simulate a required value of a braking power related variable, which required value is needed to prevent a vehicle speed of the motor vehicle from increasing above a preset desired vehicle speed in an upcoming downhill slope, determine an available value of the braking power related variable of at least one auxiliary brake of the motor vehicle, based on the determined available value of the braking power related variable and the simulated required value of the braking power related variable, control the vehicle speed and/or at least one brake actuator of the motor vehicle such that the vehicle speed does not increase above the preset desired vehicle speed in the upcoming downhill slope.

By the method and the apparatus according to the invention, it is possible to predict whether the available braking power (or braking force or braking torque) of one or more auxiliary brakes of the motor vehicle will be sufficient to prevent the vehicle speed from increasing above a desired vehicle speed in the upcoming downhill slope. If not, the motor vehicle is automatically controlled such that the vehicle speed may be kept below this desired vehicle speed, preferably without having to use a wheel brake of the motor vehicle. In this way, the risk that the driver needs to intervene and manually brake the motor vehicle, either in the downhill slope or prior to entering the downhill slope, is reduced. Apart from improving the driving comfort, the method and apparatus according to the invention contributes to improved safety and improved service life of the wheel brakes thanks to a reduced risk of wheel brake fading.

In particular, but not exclusively, the method and the apparatus according to the invention are suitable for use in a heavy goods vehicle, such as a truck or a bus.

Preferred embodiments of the invention are disclosed in the dependent claims.

It will be appreciated that all the embodiments described with reference to the method aspect of the present invention are applicable also for the apparatus aspect of the present invention. That is, the apparatus may be configured to perform any one of the method steps of the described embodiments.

Other advantageous features as well as advantages of embodiments of the present invention will appear from the following description.

Definitions

By a motor vehicle is herein intended a motor vehicle which is powered by an internal combustion engine and/or by an electric motor.

By a braking power related variable is intended a braking power, a braking force or a braking torque. For ease of understanding, this variable will in the examples be referred to as braking power, but it is to be understood that it may be any one of the mentioned variables.

BRIEF DESCRIPTION OF THE DRAWINGS

Embodiments of the invention will in the following be further described by means of example with reference to the appended drawings, wherein.

DETAILED DESCRIPTION OF THE INVENTION

Figure 1:
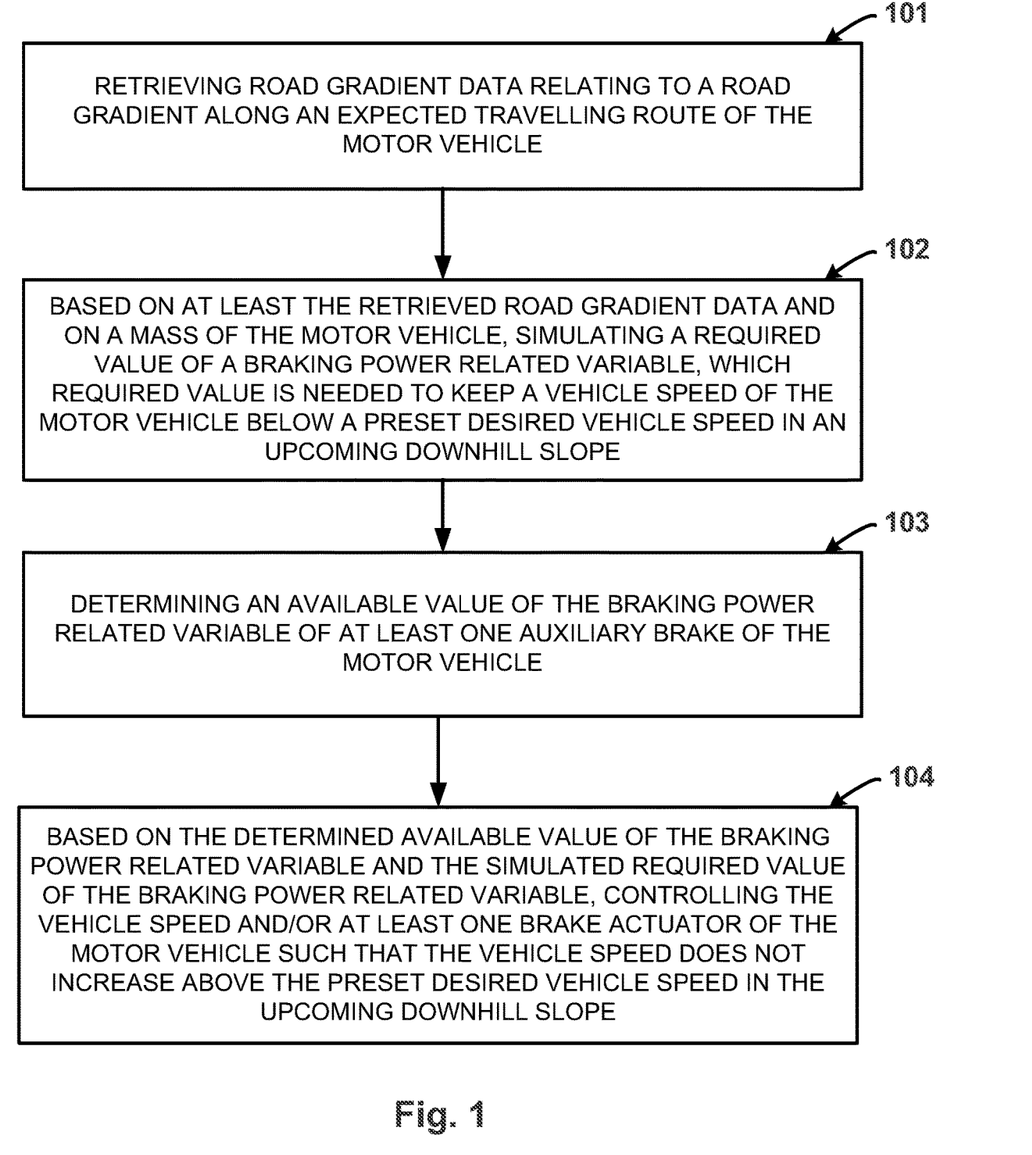
FIG. 1 is a flow chart showing a method according to an embodiment of the invention.

A method for controlling a motor vehicle according to an embodiment of the invention is schematically illustrated in FIG. 1.

In a step 101, road gradient data relating to a road gradient along an expected travelling route of the motor vehicle are retrieved. The road gradient along the expected travelling route, e.g. a road section immediately ahead of the vehicle or a road section located further away, may thereby be determined. The road gradient data may be obtained in various different ways. The road gradient may e.g. be determined on the basis of map data, e.g. from digital maps containing topographical information, in combination with positioning information, e.g. GPS (global positioning system) information. The positioning information may be used to determine the location of the motor vehicle relative to the map data so that the road gradient can be extracted from the map data. Various present-day cruise control systems use map data and positioning information. Such systems may then provide the map data and positioning information required for the method according to the present invention, thereby minimizing the additional complexity involved in determining the road gradient. The road gradient data may also be obtained based on radar information, camera information, or information from another vehicle. It may also be retrieved from positioning information and road gradient information stored previously on board, or from information obtained from traffic systems related to the expected travelling route. In systems where there is information exchange between vehicles, road gradients estimated by one vehicle may also be made available to other vehicles, either directly or via an intermediate unit such as a data base or the like.

In a step 102, based on at least the retrieved road gradient data and on a mass of the motor vehicle, a required value of a braking power related variable is simulated, which required value is needed to prevent a vehicle speed v of the motor vehicle from increasing above a preset desired vehicle speed in an upcoming downhill slope. The mass of the motor vehicle may in this case be a measured or otherwise determined, for example estimated, total mass of the motor vehicle. The mass may typically be determined by a mass estimation algorithm based on either information from a suspension of the vehicle or on a measured or estimated moment of inertia of the motor vehicle. Also other variables may be taken into account in the simulation of the required braking power, such as air resistance, rolling resistance and powertrain friction.

In a step 103, an available value of the braking power related variable of at least one auxiliary brake of the motor vehicle is determined. For example, if the required braking power was simulated in step 102, the available braking power of one or more auxiliary brake(s) is determined in this step. The auxiliary brake(s) may be a retarder, a compression release brake and/or an exhaust brake. It may also be a reversible electric motor of the motor vehicle, which when used as a generator has a braking effect on the motor vehicle. The available braking power should preferably be the braking power which is determined to be available in the upcoming downhill slope.

The available value of the braking power related variable may be determined based on vehicle data comprising at least an engine speed and at least one temperature within a cooling system of the motor vehicle. The vehicle speed v may influence the available braking power and may thereby also be taken into account, for example by determining the available braking power based on a simulated vehicle speed v of the motor vehicle in the downhill slope. For a certain vehicle speed, the engine speed can be controlled by selecting an appropriate gear.

In a step 104, based on the determined available value of the braking power related variable and the simulated required value of the braking power related variable, the vehicle speed v and/or at least one brake actuator of the motor vehicle is/are controlled such that the vehicle speed v does not increase above the preset desired vehicle speed in the upcoming downhill slope. The at least one brake actuator is herein preferably at least one brake actuator controlling the at least one auxiliary brake.

Controlling the vehicle speed v and/or the at least one brake actuator may preferably comprise automatically adjusting a setpoint of an automatic speed control of the motor vehicle before entering the downhill slope, wherein the automatic speed control may be a cruise control or a downhill speed control. Thus, without driver intervention, the setpoint may be set to a value that ensures that the vehicle speed v can be maintained at or below the preset desired vehicle speed in the downhill slope. Preferably, the setpoint may be set to a value that corresponds to the highest possible vehicle speed given the determined available value of the braking power related variable, so that a braking which is as energy efficient as possible is achieved. That is, the setpoint is set to a value which is as high as possible given the circumstances.

Controlling the vehicle speed v and/or at least one brake actuator of the motor vehicle may comprise reducing the vehicle speed v before entering the downhill slope. This is preferably carried out if the determined available value of the braking power related variable is smaller than the simulated required value of the braking power related variable in order to reduce the required braking power. Reducing the vehicle speed v prior to entering the downhill slope is in many cases preferable, so that the vehicle speed is relatively low when the motor vehicle starts to accelerate without driving torque from a powertrain of the motor vehicle. In this way, braking in the downhill slope may be delayed, or in some cases avoided.

"Before entering the downhill slope" may herein be interpreted as before entering a road section ahead of the motor vehicle with a larger downhill angle of inclination than the road section on which the motor vehicle currently travels. For example, the motor vehicle may already have entered into a downhill slope with a relatively small angle of inclination when it is determined that, on a particularly steep road section ahead of the motor vehicle, the available braking power will be smaller than the required braking power. The vehicle speed v may in this case be reduced before entering the particularly steep road section.

Reducing the vehicle speed v may e.g. comprise at least one of activating the at least one brake actuator, freewheeling the motor vehicle (i.e. with an engine of the motor vehicle disengaged), and motoring the motor vehicle. One or more auxiliary brakes, or if necessary a wheel brake, may be used to brake the motor vehicle using the at least one brake actuator. An appropriate method for reducing the vehicle speed may be selected based on e.g. the amount of braking needed and a distance to the upcoming downhill slope.

Reducing the vehicle speed v may also comprise:

determining a downhill slope entrance speed sufficiently low to prevent the vehicle speed from increasing above the preset desired vehicle speed in the upcoming downhill slope, automatically controlling the vehicle speed to the determined downhill slope entrance speed.

The downhill slope entrance speed is to be understood as the vehicle speed v of the motor vehicle when entering the downhill slope. The vehicle speed v may in this case be controlled by an automatic speed control or by another electronic control unit.

Reducing the vehicle speed v may also comprise, based on at least the simulated required value of the braking power related variable and the determined available value of the braking power related variable, determining a position or a point in time at which the vehicle speed is to be controlled to the determined downhill slope entrance speed. The timing of the speed reduction may thereby be improved. At the determined position point in time, the vehicle speed is controlled to the determined downhill slope entrance speed.

Automatically controlling the vehicle speed v to the determined downhill slope entrance speed may comprise setting the determined downhill slope entrance speed as a reference speed $v_{ref}$ of a cruise control controlling the vehicle speed. The reference speed $v_{ref}$ of the cruise control is to be understood as an actual speed setpoint to which the cruise control controls the vehicle speed v. The reference speed $v_{ref}$ may depart from the set speed $v_{set}$ set by a driver of the vehicle, by an amount depending on e.g. a performance mode of the vehicle. The reference speed may be set to the determined downhill slope entrance speed at the determined position or point in time. It may also be gradually reduced, depending on e.g. a selected performance mode of the motor vehicle.

The preset desired vehicle speed may correspond to a preset braking speed $v_{DHSC}$ of a downhill speed control of the motor vehicle, wherein the preset braking speed is a speed above which the at least one brake actuator is automatically activated by the downhill speed control. The downhill speed control is configured to control a downhill vehicle speed by automatically engaging at least one auxiliary brake when the vehicle speed exceeds the preset braking speed in the downhill slope. The braking speed $v_{DHSC}$ can either be set automatically by a system, such as a distance controller or a predictive controller aiming at minimizing fuel consumption, or manually by the driver of the motor vehicle via some interface. The braking speed $v_{DHSC}$ is usually set by its own dedicated buttons or switches. The braking speed can also be set as an offset to a set speed $v_{set}$ of a cruise control. In this case, if the set speed of the cruise control is changed, the absolute braking speed is automatically changed to maintain the offset.

If the determined available value of the braking power related variable is smaller than the simulated required value of the braking power related variable, the method may comprise reducing the preset braking speed $v_{DHSC}$ of the downhill speed control to an adjusted braking speed value. Thereby, if the braking power is found to be insufficient for maintaining the vehicle speed v below the current preset braking speed, the braking speed is adjusted. The possibilities to maintain the vehicle speed v below the preset desired vehicle speed using the auxiliary brakes thereby increase, since the motor vehicle is only allowed to accelerate to the adjusted braking speed before the brake actuators are activated. The braking speed $v_{DHSC}$ may be reset to its original higher value again as the motor vehicle approaches the end of the downhill slope, such that the motor vehicle may exit the downhill slope with a vehicle speed which is as large as possible, which is beneficial from an energy efficiency point of view. Thus, the method may comprise determining a suitable point in time at which the braking speed is reset to its original value. This point in time should be selected such that the vehicle speed may be maintained at or below the original value of the braking speed without having to manually brake the motor vehicle.

Reducing the preset braking speed $v_{DHSC}$ may comprise:

determining an adjusted braking speed value sufficiently low to prevent the vehicle speed from increasing above the adjusted braking speed value in the upcoming downhill slope, determining a position or a point in time at which the preset braking speed $v_{DHSC}$ is to be reduced to the adjusted braking speed value.

The braking speed $v_{DHSC}$ may be set to the adjusted braking speed value immediately, or with a certain delay. The braking speed may also slowly be adjusted to the lower braking speed value if this is possible. A suitable strategy for reducing the braking speed may be set depending on e.g. performance mode of the motor vehicle.

The method may further comprise:
determining a position or a point in time at which the at least one brake actuator is to be activated,
activating the at least one brake actuator at the determined position or point in time.

This may preferably be carried out if the determined available value of the braking power related variable is at least equal to the simulated required value of the braking power related variable. In this case, the braking power is expected to be sufficient to brake the motor vehicle in the upcoming downhill slope. The position or point in time when the brake actuators are activated may therefore be within the downhill slope. An optimized braking of the motor vehicle may be achieved by in this way controlling the position or point in time at which the brake actuator(s) is/are engaged. Also if the determined available value of the braking power related variable is smaller than the simulated required value of the braking power related variable, it may be useful to determine a position or a point in time at which the brake actuators are to be activated. In this case, the brake actuators may be activated at a position or point in time prior to entering the downhill slope.

Figure 2:
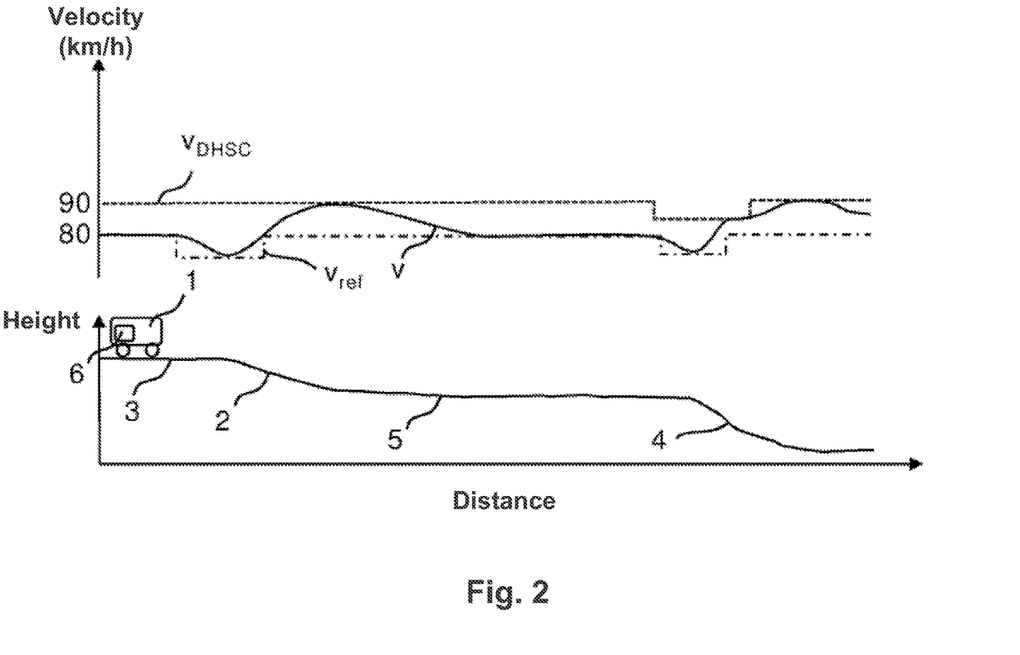
FIG. 2 illustrates an example of a method according to an embodiment of the invention, and FIG. 3 schematically shows a control unit for carrying out the method according to an embodiment of the invention.

In an example illustrated in FIG. 2, the method according to an embodiment of the invention is carried out in a motor vehicle 1 travelling on a road 5 and approaching a downhill slope 2, wherein the motor vehicle 1 comprises an apparatus 6 configured for carrying out the method according to an embodiment of the invention. In FIG. 2, the upper curve describes the vehicle speed v while the lower curve shows the altitude h of the road, both as a function of travelled distance d.

The motor vehicle 1 is equipped with a cruise control having a set speed $v_{set}$ of 80 km/h. The motor vehicle is further equipped with a downhill speed control, with a preset braking speed $v_{DHSC}$ of 90 km/h (dashed line). As the motor vehicle travels on a level road section 3, the cruise control controls the vehicle speed v (solid line) to 80 km/h, i.e. the reference speed $v_{ref}$ of the cruise control (dash-dotted line) coincides with its set speed $v_{set}$. The motor vehicle 1 is also equipped with auxiliary brakes in the form of a retarder and an engine brake (not shown).

In the step 101, road gradient data are retrieved in the apparatus 6 of the motor vehicle 1 and it is determined that the motor vehicle 1 is approaching the downhill slope 2. In the step 102, the required braking power, i.e. the braking power needed to maintain the vehicle speed v below the braking speed of 90 km/h in the downhill slope 2, is simulated. In the step 103, the available braking power of the auxiliary brakes, given that the motor vehicle 1 enters the downhill slope with its current vehicle speed, is determined. The available braking power and the required braking power are compared, and it is found that the available braking power is insufficient for maintaining the vehicle speed v below the braking speed $v_{DHSC}$ of 90 km/h if the motor vehicle 1 continues to travel at the current vehicle speed of 80 km/h into the downhill slope 2. In this situation, the vehicle speed v would start to increase when the motor vehicle enters the slope, and when the vehicle speed v would reach 90 km/h, the brake actuators would be activated, engaging the auxiliary brakes. However, the braking power of the auxiliary brakes would be insufficient for maintaining the vehicle speed v, which would consequently continue to increase above 90 km/h. The driver would therefore have to brake the motor vehicle manually using the wheel brake. The vehicle speed is therefore reduced prior to entering the downhill slope by controlling the vehicle speed v to a lowest possible value given the set speed $v_{set}$ and a performance mode of the motor vehicle 1, i.e. by setting the reference speed $v_{ref}$ of the cruise control to a value which is as low as possible, i.e. to a downhill slope entrance speed sufficiently low to be able to maintain the vehicle speed v at or below the braking speed $v_{DHSC}$ in the downhill slope 2. In the downhill slope 2, when the motor vehicle 1 reaches the braking speed $v_{DHSC}$, the brake actuators are activated and the motor vehicle 1 may safely travel down the slope 2 without exceeding the braking speed $v_{DHSC}$.

The motor vehicle 1 now approaches a second, steeper, slope 4. It is determined that the available braking power is insufficient for maintaining the vehicle speed v below the preset braking speed $v_{DHSC}$ of 90 km/h if the motor vehicle 1 continues to travel at the current vehicle speed of 80 km/h into the downhill slope. The vehicle speed v is therefore reduced before reaching the downhill slope 4, by reducing the reference speed $v_{ref}$ of the cruise control. Furthermore, the preset braking speed $v_{DHSC}$ is reduced to an adjusted value of the braking speed (dotted line) sufficiently low to be able to maintain the vehicle speed v in the downhill slope 4. For example, the braking speed $v_{DHSC}$ may be set to an adjusted value of 85 km/h. Thereby, the brake actuators will be activated earlier in the downhill slope 4 and the vehicle speed v will cease to increase and be maintained below the adjusted value of the braking speed $v_{DHSC}$ of 85 km/h. As the vehicle approaches the end of the downhill slope 4, the braking speed $v_{DHSC}$ is once again set to the original value of 90 km/h, such that the motor vehicle may exit the downhill slope 4 with a vehicle speed v which is as large as possible, i.e. 90 km/h. No manual braking is necessary.

One skilled in the art will appreciate that a method according to embodiments of the present invention may be implemented in a computer program comprising instructions which, when executed in a computer, causes the computer to carry out the method. The computer program usually takes the form of a computer program product which comprises a suitable computer-readable digital storage medium on which the computer program is stored. Said computer-readable digital storage medium comprises a suitable memory, e.g. ROM (read-only memory), PROM (programmable read-only memory), EPROM (erasable PROM), flash memory, EEPROM (electrically erasable PROM), a hard disc unit, etc.

Figure 3:
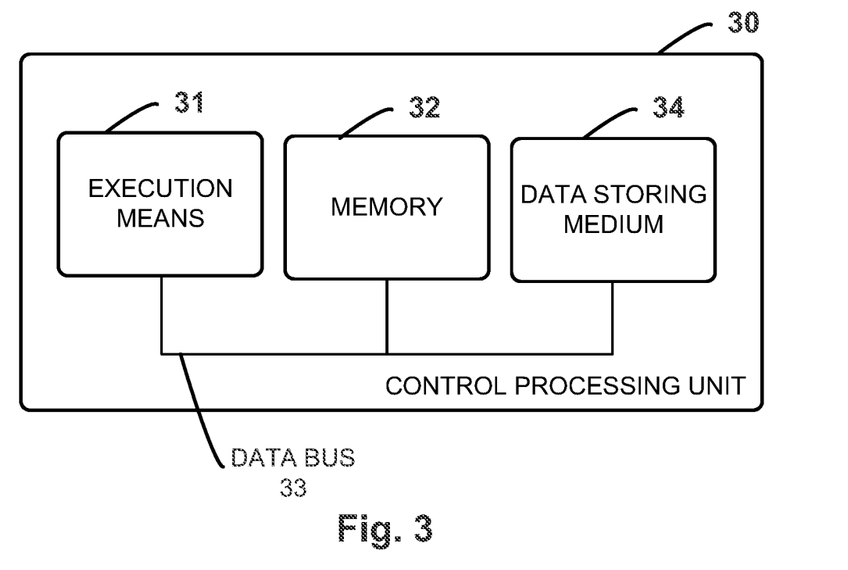

An apparatus 6 according to the invention, adapted to carry out the above described steps of the method according to the invention, may comprise one electronic control unit or two or more cooperating electronic control units configured to control different parts of the motor vehicle 1. FIG. 3 illustrates very schematically such an electronic control unit 30 forming part of an apparatus according to an embodiment of the invention. The control unit 30 comprises an execution means 31, such as a central processor unit (CPU), for executing a computer program. The execution means 31 communicates with a memory 32, for example of the type RAM, through a data bus 33. The control unit 30 comprises also a non-transitory data storing medium 34, for example in the form of a Flash memory or a memory of the type ROM, PROM, EPROM or EEPROM. The execution means 31 communicates with the data storing medium 34 through the data bus 33. A computer program comprising computer program code for implementing a method according to an embodiment of the invention is stored on the data storing medium 34.

The invention is of course not in any way restricted to the embodiments described above, but many possibilities to modifications thereof would be apparent to a person with skill in the art without departing from the scope of the invention as defined in the appended claims.

The invention claimed is:

1. A method for controlling a motor vehicle, the method comprising:
retrieving road gradient data relating to a road gradient along an expected travelling route of the motor vehicle;
based on at least the retrieved road gradient data and on a mass of the motor vehicle, simulating a required value of a braking power related variable, which required value is needed to prevent a vehicle speed of the motor vehicle from increasing above a preset desired vehicle speed in an upcoming downhill slope;
determining an available value of the braking power related variable of at least one auxiliary brake of the motor vehicle; and
based on the determined available value of the braking power related variable and the simulated required value of the braking power related variable, controlling the vehicle speed and/or at least one brake actuator of the motor vehicle prior to entering the upcoming downhill slope such that the vehicle speed does not increase above the preset desired vehicle speed in the upcoming downhill slope.

2. The method according to claim 1, wherein controlling the vehicle speed and/or the at least one brake actuator comprises automatically adjusting a setpoint of an automatic speed control of the motor vehicle before entering the downhill slope.

3. The method according to claim 1, wherein controlling the vehicle speed and/or the at least one brake actuator of the motor vehicle comprises reducing the vehicle speed before entering the downhill slope.

4. The method according to claim 3, wherein reducing the vehicle speed comprises:
determining a downhill slope entrance speed sufficiently low to prevent the vehicle speed from increasing above the preset desired vehicle speed in the upcoming downhill slope; and
automatically controlling the vehicle speed to the determined downhill slope entrance speed.

5. The method according to claim 4, wherein reducing the vehicle speed further comprises:
based on at least the simulated required value of the braking power related variable and the determined available value of the braking power related variable, determining a position or a point in time at which the vehicle speed is to be controlled to the determined downhill slope entrance speed.

6. The method according to claim 4, wherein automatically controlling the vehicle speed to the determined downhill slope entrance speed comprises setting the determined downhill slope entrance speed as a reference speed of a cruise control controlling the vehicle speed.

7. The method according to claim 3, wherein reducing the vehicle speed comprises at least one of activating the at least one brake actuator, free-wheeling the motor vehicle, and motoring the motor vehicle.

8. The method according to claim 1, wherein the value of the preset desired vehicle speed is set to a preset braking speed of a downhill speed control of the motor vehicle, wherein the preset braking speed is a speed above which the at least one brake actuator is automatically activated by the downhill speed control.

9. The method according to claim 8, wherein, when the determined available value of the braking power related variable is smaller than the simulated required value of the braking power related variable, controlling the vehicle speed and/or the at least one brake actuator comprises:
reducing the preset braking speed of the downhill speed control to an adjusted braking speed value.

10. The method according to claim 9, wherein reducing the preset braking speed comprises:
determining an adjusted braking speed value sufficiently low to prevent the vehicle speed from increasing above the adjusted braking speed value in the upcoming downhill slope; and
determining a position or a point in time at which the preset braking speed is to be reduced to the adjusted braking speed value.

11. The method according to claim 1, wherein controlling the vehicle speed and/or the at least one brake actuator comprises:
determining a position or a point in time at which the at least one brake actuator is to be activated; and
activating the at least one brake actuator at the determined position or point in time.

12. The method according to claim 1, wherein the available value of the braking power related variable is determined based on vehicle data comprising at least an engine speed and at least one temperature within a cooling system of the motor vehicle.

13. A non-transitory computer-readable medium, said storing thereon a computer program product used for controlling a motor vehicle, said computer program code comprising computer instructions to cause one or more computer processors to perform the following operations:
retrieve road gradient data relating to a road gradient along an expected travelling route of the motor vehicle;
based on at least the retrieved road gradient data, simulate a required value of a braking power related variable, which required value is needed to prevent a vehicle speed of the motor vehicle from increasing above a preset desired vehicle speed in an upcoming downhill slope;
determine an available value of the braking power related variable of at least one auxiliary brake of the motor vehicle; and
based on the determined available value of the braking power related variable and the simulated required value of the braking power related variable, control the vehicle speed and/or at least one brake actuator of the motor vehicle prior to entering the upcoming downhill slope such that the vehicle speed does not increase above the preset desired vehicle speed in the upcoming downhill slope.

14. An apparatus configured for controlling a motor vehicle, the apparatus comprising:
at least one computer processor; and
a non-transitory computer-readable medium storing thereon a computer program product used for controlling a motor vehicle, said computer program code comprising computer instructions to cause one or more computer processors to perform the following operations:
retrieve road gradient data relating to a road gradient along an expected travelling route of the motor vehicle;
based on at least the retrieved road gradient data, simulate a required value of a braking power related variable, which required value is needed to prevent a vehicle speed of the motor vehicle from increasing above a preset desired vehicle speed in an upcoming downhill slope;

determine an available value of the braking power related variable of at least one auxiliary brake of the motor vehicle; and based on the determined available value of the braking power related variable and the simulated required value of the braking power related variable, control the vehicle speed and/or at least one brake actuator of the motor vehicle prior to entering the upcoming downhill slope such that the vehicle speed does not increase above the preset desired vehicle speed in the upcoming downhill slope.

15. A motor vehicle comprising an apparatus configured for controlling a motor vehicle, the apparatus comprising:

at least one computer processor; and a non-transitory computer-readable medium storing thereon a computer program product used for controlling a motor vehicle, said computer program code comprising computer instructions to cause one or more computer processors to perform the following operations:

retrieve road gradient data relating to a road gradient along an expected travelling route of the motor vehicle;

based on at least the retrieved road gradient data, simulate a required value of a braking power related variable, which required value is needed to prevent a vehicle speed of the motor vehicle from increasing above a preset desired vehicle speed in an upcoming downhill slope;

determine an available value of the braking power related variable of at least one auxiliary brake of the motor vehicle; and based on the determined available value of the braking power related variable and the simulated required value of the braking power related variable, control the vehicle speed and/or at least one brake actuator of the motor vehicle prior to entering the upcoming downhill slope such that the vehicle speed does not increase above the preset desired vehicle speed in the upcoming downhill slope.

* * * * *